(12) United States Patent
Zhao (10) Patent No.: US 12,317,228 B2
(45) Date of Patent: May 27, 2025

(54) METHOD AND DEVICE FOR TRANSMITTING CONTROL INFORMATION AND DATA

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 385 days.

(21) Appl. No.: 17/294,380

(22) PCT Filed: Nov. 15, 2018

(86) PCT No.: PCT/CN2018/115729
§ 371 (c)(1),
(2) Date: May 14, 2021

(87) PCT Pub. No.: WO2020/097881
PCT Pub. Date: May 22, 2020

(65) Prior Publication Data
US 2022/0015066 A1  Jan. 13, 2022

(51) Int. Cl.
*H04W 72/04* (2023.01)
*H04L 27/26* (2006.01)
(Continued)

(52) U.S. Cl.
CPC ....... *H04W 72/02* (2013.01); *H04L 27/26025* (2021.01); *H04W 52/52* (2013.01);
(Continued)

(58) Field of Classification Search
CPC ..... H04W 52/16; H04W 52/52; H04W 72/02; H04W 72/0446; H04W 72/0453; H04W 72/20
See application file for complete search history.

(56) References Cited

U.S. PATENT DOCUMENTS

2013/0022147 A1 * 1/2013 Sun .......................... H04L 1/20
375/329
2015/0043456 A1  2/2015 Rikkinen et al.
(Continued)

FOREIGN PATENT DOCUMENTS

CN  101399803 A  4/2009
CN  101784114 A  7/2010
(Continued)

OTHER PUBLICATIONS

Extended European Search Report of EP Application No. 18940229.0 dated May 27, 2022, (11p).
(Continued)

*Primary Examiner* — Mansour Oveissi
(74) *Attorney, Agent, or Firm* — Arch & Lake LLP (57) ABSTRACT

A method and device are provided for transmitting control information and data. In the method, the device determines a time-frequency resource corresponding to control information and user data to be sent. The device transmits the control information and the user data on the time-frequency resource. In response to determining that a first time-frequency resource corresponding to the control information and a second time-frequency resource corresponding to the user data belong to the same time unit, the device set a part of the second time-frequency resource to occupy starting time-domain symbols of the time unit.

10 Claims, 7 Drawing Sheets

(51) Int. Cl.
*H04W 52/52* (2009.01)
*H04W 72/02* (2009.01)
*H04W 72/0446* (2023.01)
*H04W 72/0453* (2023.01)
*H04W 72/20* (2023.01)

(52) U.S. Cl.
CPC ... *H04W 72/0446* (2013.01); *H04W 72/0453* (2013.01); *H04W 72/20* (2023.01)

(56) References Cited

U.S. PATENT DOCUMENTS

| | | | |
|---|---|---|---|
| 2016/0204921 | A1 | 7/2016 | Kim et al. |
| 2017/0041971 | A1* | 2/2017 | Kim .................. H04W 76/14 |
| 2017/0338987 | A1 | 11/2017 | Zhou et al. |
| 2017/0353947 | A1 | 12/2017 | Ang et al. |
| 2018/0014283 | A1 | 1/2018 | You et al. |
| 2019/0037540 | A1* | 1/2019 | Seo .................. H04W 72/1273 |
| 2020/0059766 | A1* | 2/2020 | Kim .................. H04W 28/26 |
| 2021/0250159 | A1* | 8/2021 | Su .................. H04L 5/0094 |

FOREIGN PATENT DOCUMENTS

| | | |
|---|---|---|
| CN | 102668674 A | 9/2012 |
| CN | 103259624 A | 8/2013 |
| CN | 103716823 A | 4/2014 |
| CN | 104541559 A | 4/2015 |
| CN | 106605385 A | 4/2017 |
| CN | 107113538 A | 8/2017 |
| CN | 108174445 A | 6/2018 |
| CN | 108401528 A | 8/2018 |
| CN | 108521884 A | 9/2018 |
| EP | 3439217 A1 | 2/2019 |
| EP | 3522593 A1 | 8/2019 |
| WO | 2017166902 A1 | 10/2017 |
| WO | 2018061476 A1 | 4/2018 |
| WO | 2018171603 A1 | 9/2018 |

OTHER PUBLICATIONS

International Search Report issued in PCT/CN2018/115729, dated Jul. 25, 2019 with English translation, (4p).

Kung, Te-Lung, et al., "Frequency Domain Symbol Synchronization For OFDM Systems" Department of Electrical and Computer Engineering, University of Minnesota, 200 Union Street SE, Minneapolis, MN 55455, USA, IEEE International Conference on Electro/Information Technology, 2011, (5p).

Wang, Ke, "Research on the Downlink Scheduling Algorithms For Long Term Evolution Communication System", China Doctoral Dissertations Full-Text Database, Information Technology I, (137p).

The First CNOA issued in CN Application No. 202110918026.4 dated Jun. 28, 2024 with English translation, (14p).

Huang Chenheng, "Review on Physical Layer Key Technology of 3GPP 5G NR," Mobile Communication, vol. 42, issue: 10, Oct. 15, 2018 with English translation, (3p).

* cited by examiner

METHOD AND DEVICE FOR TRANSMITTING CONTROL INFORMATION AND DATA

CROSS-REFERENCE TO RELATED APPLICATIONS

This application is a U.S. national stage of International Application No. PCT/CN2018/115729, filed Nov. 15, 2018, the disclosure of which is hereby incorporated by reference in its entirety for all purposes.

TECHNICAL FIELD

The present disclosure relates to the field of communication technology, in particular to a method and device for transmitting control information and data.

BACKGROUND

In related arts, the Internet of Vehicles is a new generation of new Internet. The Internet of Vehicles includes communication between vehicle mounted devices, communication between a vehicle mounted device and a roadside device, communication between a vehicle mounted device and a handheld device. The communication can be sidelink communication, or be relayed through a base station and a core network. Due to the restriction of radio frequency side devices, in response to that the received power changes drastically, the automatic gain control (AGC) of a radio frequency amplifier needs a certain period of time to adjust, and signals may not be received correctly during the adjustment period.

SUMMARY

Embodiments of the present disclosure provide a method and device for transmitting control information and data. The technical solutions are described below.

A first aspect of the present disclosure provides a method for transmitting control information and data, including:

determining a time-frequency resource corresponding to control information and user data to be sent; and transmitting the control information and the user data on the time-frequency resource;

when a first time-frequency resource corresponding to the control information and a second time-frequency resource corresponding to the user data belong to the same time unit, a part of the second time-frequency resource occupies starting time-domain symbols of the time unit; and/or in response to that the first time-frequency resource corresponding to the control information and the second time-frequency resource corresponding to the user data belong to different time units, the first time-frequency resource occupies at least a half of time-domain symbols of a first time unit.

A second aspect of the present disclosure provides a device for transmitting control information and data, including:

a determining module, configured to determine a time-frequency resource corresponding to control information and user data to be sent; and a transmitting module, configured to transmit the control information and the user data on the time-frequency resource;

in response to that a first time-frequency resource corresponding to the control information and a second time-frequency resource corresponding to the user data belong to the same time unit, a part of the second time-frequency resource occupies starting time-domain symbols of the time unit; and/or in response to that the first time-frequency resource corresponding to the control information and the second time-frequency resource corresponding to the user data belong to different time units, the first time-frequency resource occupies at least a half of time-domain symbols of a first time unit.

A third aspect of the present disclosure provides a device for transmitting control information and data, including:

a processor;

a memory for storing instructions executable by the processor;

where the processor is configured to:

determine a time-frequency resource corresponding to control information and user data to be sent; and transmit the control information and the user data on the time-frequency resource;

in response to that a first time-frequency resource corresponding to the control information and a second time-frequency resource corresponding to the user data belong to the same time unit, a part of the second time-frequency resource occupies starting time-domain symbols of the time unit; and/or in response to that the first time-frequency resource corresponding to the control information and the second time-frequency resource corresponding to the user data belong to different time units, the first time-frequency resource occupies at least a half of time-domain symbols of a first time unit.

A fourth aspect of embodiments of the present disclosure provides a computer-readable storage medium for storing computer instructions that, when executed by a processor, are used for executing the method described above.

It should be understood that the above general description and detailed description described hereinafter are only exemplary and explanatory, and not intended to limit the present disclosure.

BRIEF DESCRIPTION OF THE DRAWINGS

The drawings herein are incorporated into the specification and constitute a part of the specification, show embodiments that conform to the disclosure, and together with the specification are used to explain the principle of the disclosure.

DETAILED DESCRIPTION

The exemplary embodiments will be described in detail here, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of devices and methods consistent with some aspects of the present disclosure as recited in the appended claims.

In the related art, in the Internet of Vehicles, the channel fading may be severe due to long-distance transmission or rapid vehicle movement, and the signal power during reception may be greatly reduced. Due to the restriction of the radio frequency side devices, in response to that the received power changes drastically, the automatic gain control (AGC) of a radio frequency amplifier needs a certain period to adjust. In addition, in the Internet of Vehicles, control information is usually transmitted first, and then user data, and the control information often occupies the starting time-domain symbol in the time slot. However, the error tolerance rate of the control information is low, so that the control information fails to be received and decoded correctly due to the adjustment of the AGC.

In view of the above problems, to ensure the control information to be received and decoded correctly as much as possible, it is tried to prevent the control information from only occupying the start symbol of the time unit in the present embodiment.

Figure 1:
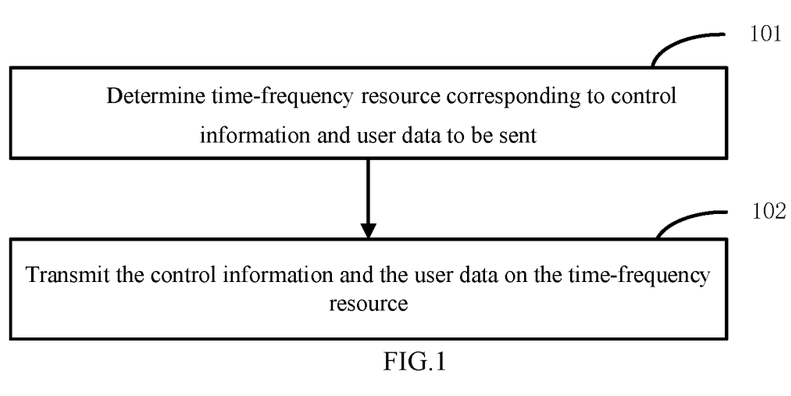
FIG. 1 is a flowchart showing a method for transmitting control information and data according to an exemplary embodiment.

FIG. 1 is a flowchart showing a method for transmitting control information and data according to an exemplary embodiment. The method for transmitting control information and data is applied to user equipment, which may be a mobile phone, a computer, a digital broadcasting user equipment, a messaging device, a game console, a tablet device, a medical device, a fitness device, a personal digital assistant, etc. As shown in FIG. 1, the method includes steps 101-102.

In step 101, a time-frequency resource corresponding to control information and user data to be sent is determined.

In step 102, the control information and user data are transmitted on the time-frequency resource.

In response to that a first time-frequency resource corresponding to the control information and a second time-frequency resource corresponding to the user data belong to the same time unit, a part of the second time-frequency resource occupies starting time-domain symbols of the time unit; and/or in response to that the first time-frequency resource corresponding to the control information and the second time-frequency resource corresponding to the user data belong to different time units, the first time-frequency resource occupies at least a half of the time-domain symbols of a first time unit.

The user equipment in the present embodiment is suitable for user equipment in the Internet of Vehicles, and may be a vehicle-mounted user equipment, or a roadside user equipment.

The time unit in the present embodiment may be a time slot, or a certain number of time-domain symbols.

An implementation of the embodiment is that the control information and the user data may be in the same time unit, and a part of the user data occupies the starting time-domain symbol of the time unit. Because the error tolerance rate of the user data is higher, correct user data can also be obtained through the error correction capability of channel decoding even if the user data is affected by the AGC adjustment. The control information is at a front position in the time unit as much as possible, so that part of the user data is at time-domain symbol positions prior to the control information, and the rest of the user data is at time-domain symbol positions next to the control information. In this way, it is helpful to decode the control information and user data as soon as possible. In this embodiment, the control information can occupy time-domain symbols as less as possible.

Another implementation of the embodiment is that the control information and the user data may be in different time units. In this case, the control information independently occupies one time unit, and occupies at least half of the time-domain symbols of the first time unit. In this way, since the control information occupies more time-domain symbols, the correct decoding of the control information can also be ensured through the error correction capability of channel decoding. The first time unit where the control information is located and the second time unit where the user data is located may be continuous or discontinuous.

In an embodiment, the number of the starting time-domain symbols is determined according to the frequency band and the subcarrier spacing used for transmitting the control information and user data.

In this embodiment, the number K of the start time-domain symbols can be pre-set. For example, upon operating on a carrier within frequency range 1 (less than 6 GHz), the maximum AGC adjustment time is about 15us, and the subcarrier spacing is generally 30 KHz and 60 KHz at most, the length of a slot (14 time-domain symbols) is 0.5 ms and 0.25 ms, thus the AGC adjustment time will only affect the starting time-domain symbol, K is set as 1; upon operating on a carrier within frequency range 2 (greater than 6 GHz), the maximum AGC adjustment time is about 10us, and the subcarrier spacing is generally 120 KHz at most, the length of a slot is 0.125 ms, thus the AGC adjustment time may affect two time-domain symbols at most, K is set as 2.

The greater the subcarrier spacing, the shorter the time length of a time-domain symbol. Therefore, for a given AGC modulation time, the value of K may be larger. In order to reduce the decoding delay, the control information is located in front positions in the time unit as far as possible, the less time-domain symbols occupied by user data prior to the control information, the better it is, meanwhile, the influence of the AGC adjustment on the control information should be avoided. Therefore, the number of start time-domain symbols occupied by the user data prior to the control information only needs to meet the K value.

In an embodiment, in response to that the first time-frequency resource corresponding to the control information and the second time-frequency resource corresponding to the user data belong to the same time unit, the control information and the user data may occupy either the same frequency domain start position and bandwidth, or different frequency domain start positions and bandwidths. The control information and user data can also occupy either the same time-domain symbol or different time-domain symbols. The part of the user data prior to the control information and the part of the user data next to the control information may occupy either the same frequency domain starting position and bandwidth, or different frequency domain starting positions and bandwidths.

Figure 2:
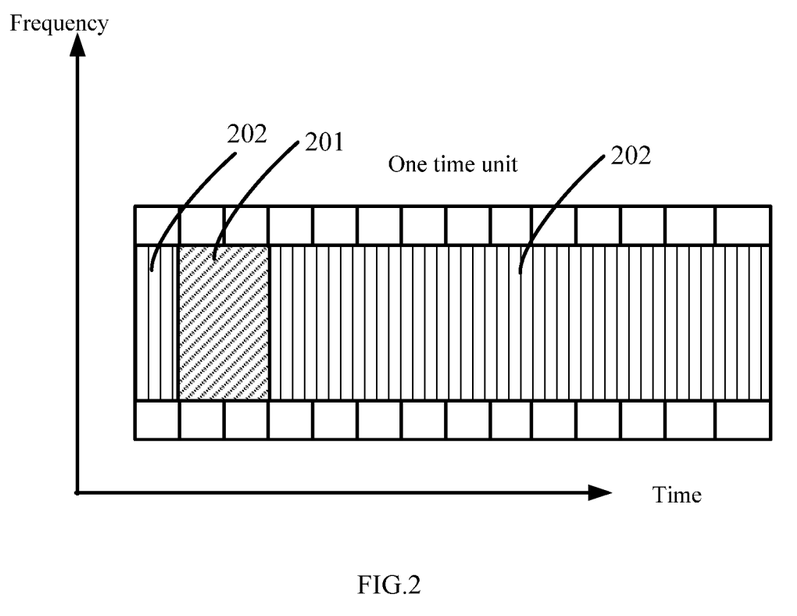
FIG. 2 is a schematic diagram showing control information and user data according to an exemplary embodiment.

As shown in FIGS. 2-5, in FIG. 2, the control information 201, the user data 202 prior to the control information 201 and the user data 202 next to the control information 201 are all located at the same frequency position and bandwidth. However, the control information 201 and the user data 202 occupy different time-domain symbols.

Figure 3:
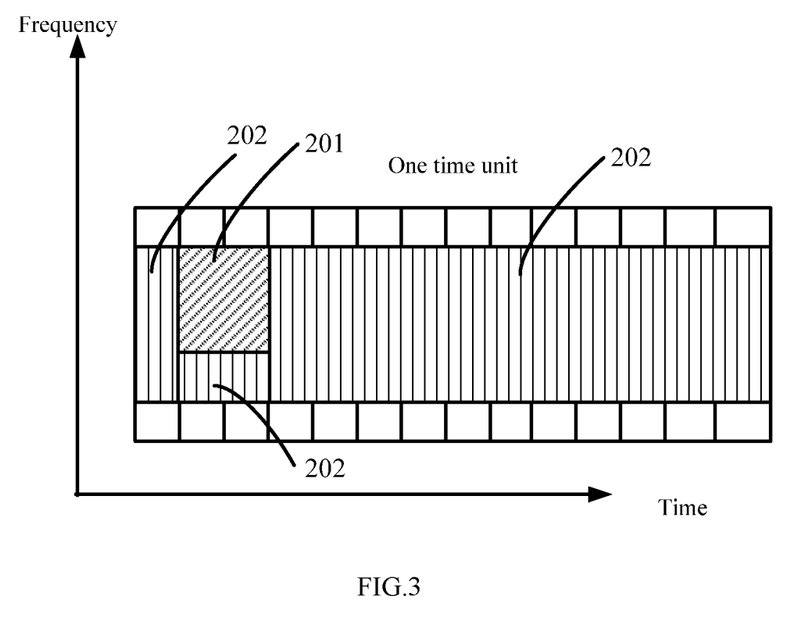
FIG. 3 is a schematic diagram showing control information and user data according to an exemplary embodiment.

In FIG. 3, a part of the user data 202 and the control information 201 occupy the same time-domain symbols, and occupy different frequency positions and bandwidths. Other part of the user data 202 and the control information 201 occupy the same frequency position and bandwidth.

Figure 4:
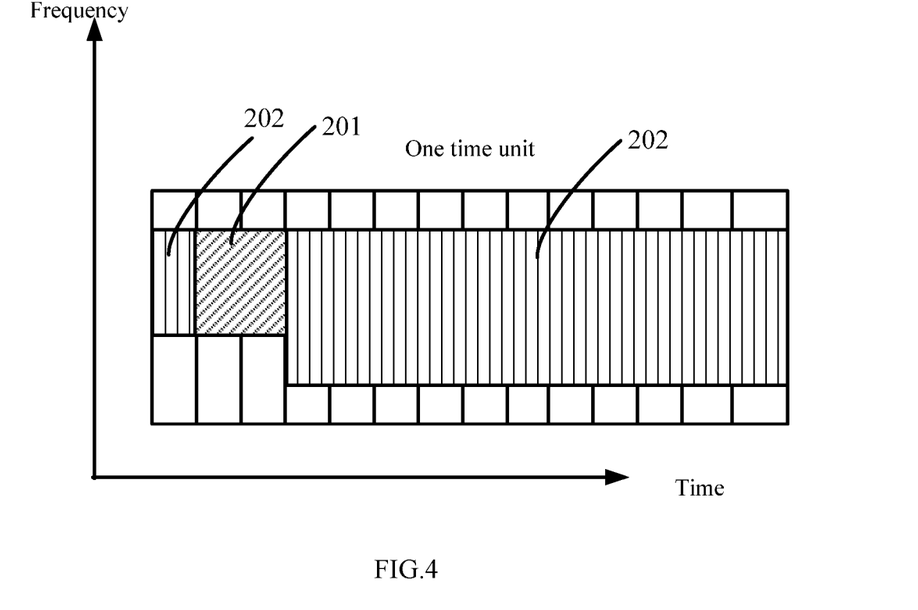
FIG. 4 is a schematic diagram showing control information and user data according to an exemplary embodiment.

In FIG. 4, the part of the user data 202 prior to the control information 201 and the control information 201 are located at the same frequency position and bandwidth, and the user data 202 next to the control information 201 and the control information 201 are located at the same frequency start position, but different bandwidths.

Figure 5:
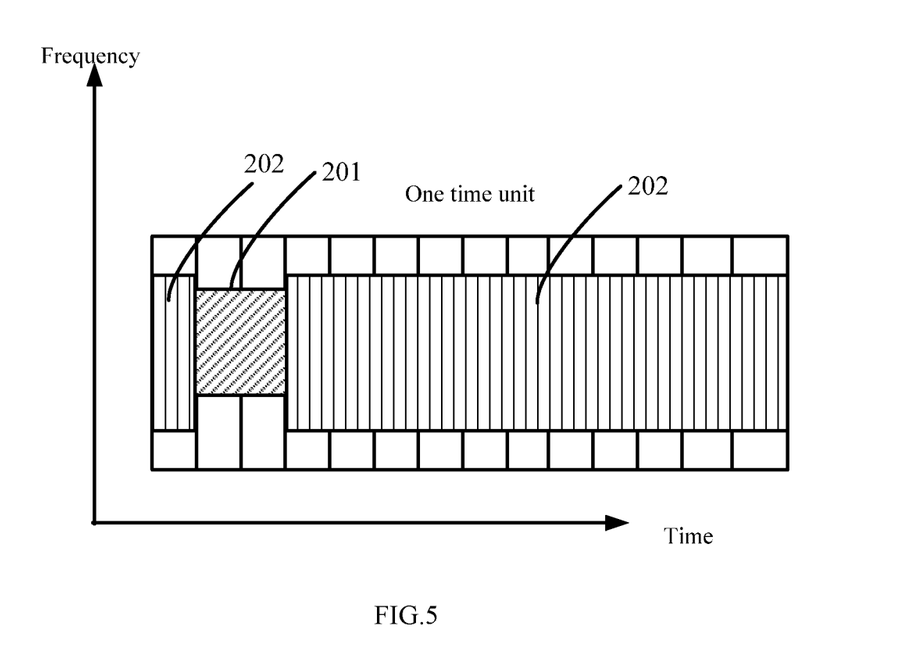
FIG. 5 is a schematic diagram showing control information and user data according to an exemplary embodiment.

In FIG. 5, the control information 201 and the user data 202 are located at different frequency positions and bandwidths. The part of the user data 202 prior to the control information 201 and the part of the user data 202 next to the control information 201 are located at the same frequency start position and bandwidth.

Figure 6:
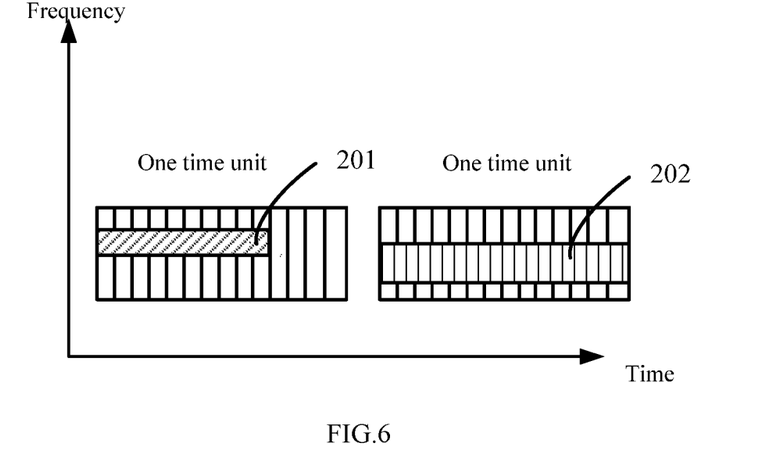
FIG. 6 is a schematic diagram showing control information and user data according to an exemplary embodiment.

In an embodiment, in response to that the first time-frequency resource corresponding to the control information and the second time-frequency resource corresponding to the user data belong to different time units, the control information and the user data may occupy either the same frequency domain start position and bandwidth, or different frequency domain start positions and bandwidths. As shown in FIG. 6, the control information 201 and the user data 202 occupy different frequency domain starting positions and bandwidths.

In an embodiment, in response to that the first time-frequency resource corresponding to the control information and the second time-frequency resource corresponding to the user data belong to the same time unit, transmission power of part of the user data prior to the control information and that of part of user data next to the control information are the same.

In the present embodiment, the adjustment of the transmission power used in the same time unit is reduced as much as possible, that is, the impact on the receiving end is reduced.

In an embodiment, the control information and/or the user data includes a demodulation reference signal.

In order to decode the control information and the user data as fast as possible, the demodulation reference signal should be located at a front position in the time unit as much as possible. Therefore, in the embodiment, the demodulation reference signal may be located in the first time-frequency resource where the control information is located, or the second time-frequency resource where part of the user data prior to the control information is located.

Figure 7:
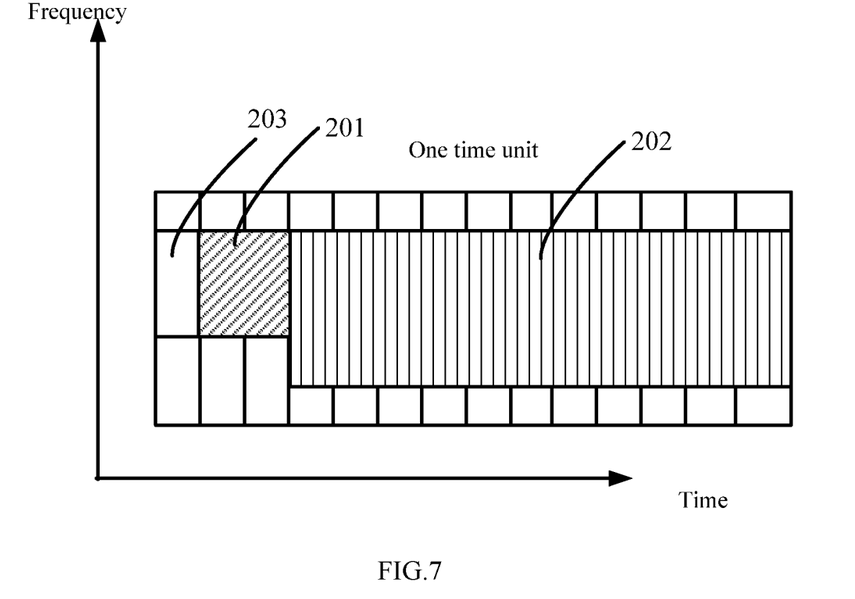
FIG. 7 is a schematic diagram showing control information and user data according to an exemplary embodiment.

As shown in FIGS. 7-9, in FIG. 7, the demodulation reference signal 203 is located in the second time-frequency resource where part of the user data prior to the control information is located, and occupies all the time-frequency resources of the part of the user data prior to the control information, that is to say, all of the user data prior to the control information is the demodulation reference signal.

Figure 8:
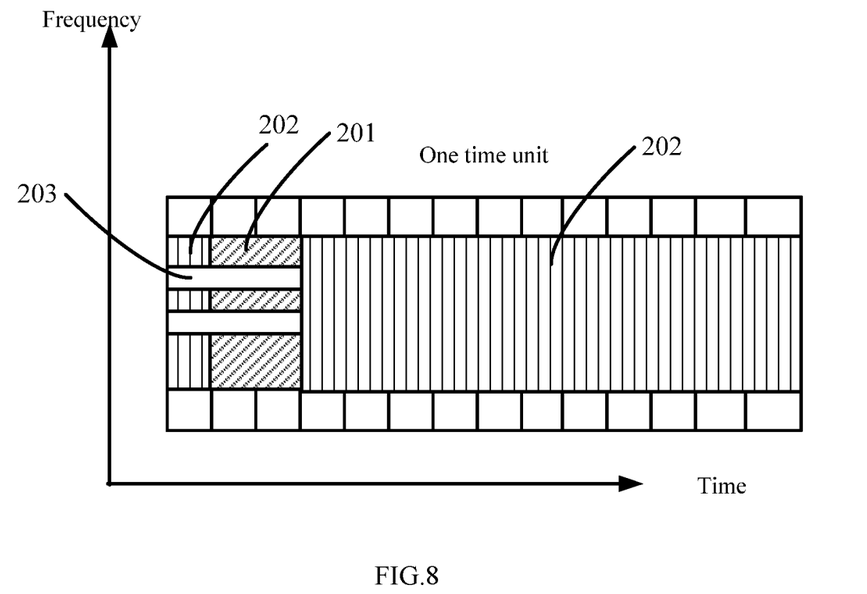
FIG. 8 is a schematic diagram showing control information and user data according to an exemplary embodiment.

In FIG. 8, a part of the demodulation reference signal 203 is located in the first time-frequency resource, and another part of the demodulation reference signal 203 is located in the second time-frequency resource prior to the control information, that is to say, both of the control information and the user data include the demodulation reference signal.

Figure 9:
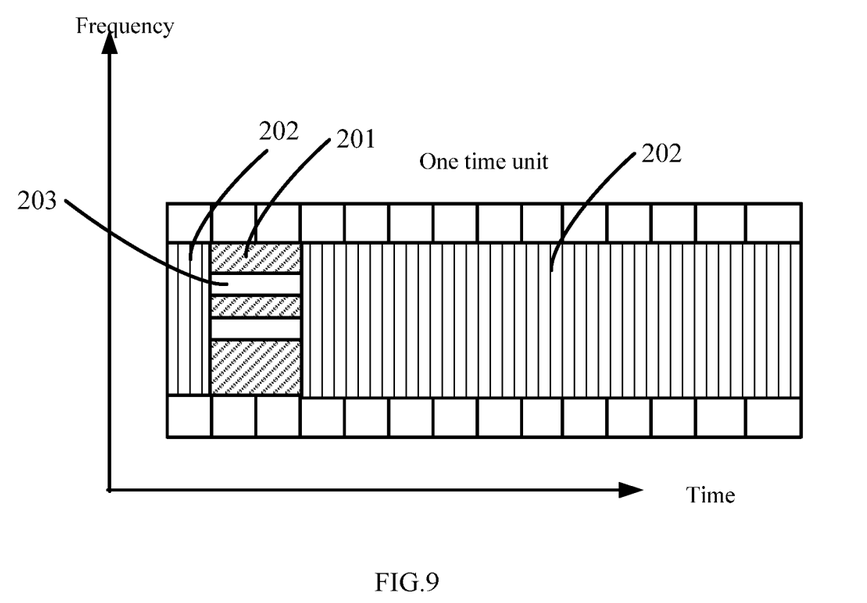
FIG. 9 is a schematic diagram showing control information and user data according to an exemplary embodiment.

In FIG. 9, the demodulation reference signal 203 is located in the first time-frequency resource, that is to say, the control information includes the demodulation reference signal.

In the embodiment, the position of the demodulation reference signal can be flexibly configured, which is suitable for various application environments.

In an embodiment, in response to that the first time-frequency resource corresponding to the control information and the second time-frequency resource corresponding to the user data belong to the same time unit, the first time-frequency resource and the second time-frequency resource belong to a first resource pool.

In response to that the first time-frequency resource corresponding to the control information and the second time-frequency resource corresponding to the user data belong to different time units, the first time-frequency resource and the second time-frequency resource belong to a second resource pool, where the first resource pool and the second resource pool misalign in the time-frequency resource.

Figure 10:
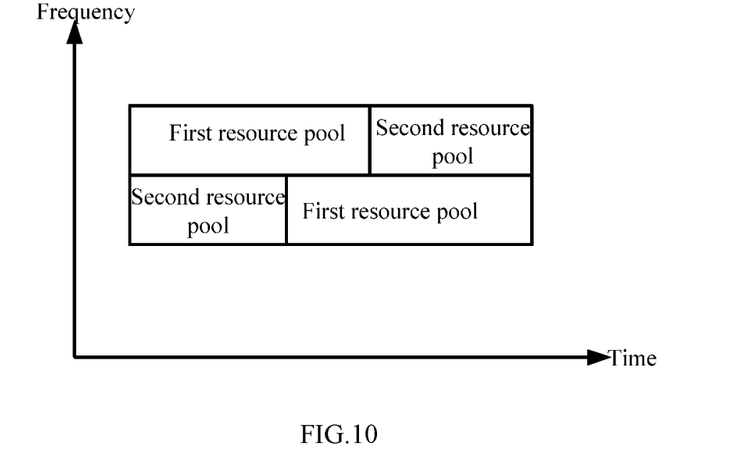
FIG. 10 is a schematic diagram showing a resource pool according to an exemplary embodiment.

In the embodiment, the above two situations are compatible, and the two situations are distinguished based on different resource pools. As shown in FIG. 10, the first resource pool and the second resource pool may be located in different frequency domains or different time domains. The sizes of the first resource pool and the second resource pool can also be flexibly configured. The first resource pool and the second resource pool may alternately appear in time-frequency resources.

User equipment can transmit information merely in one type of resource pool, or it can transmit information in two types of resource pools. The network side may notify, through a downlink signaling, the user equipment that what kind of resource pool the user equipment is suitable for, and related configuration information about the resource pool, such as the time-frequency resources and period length of the resource pool.

The above embodiments can be freely combined according to actual requirements.

Device embodiments of the present disclosure capable of implementing the method embodiments of the present disclosure are described below.

Figure 11:
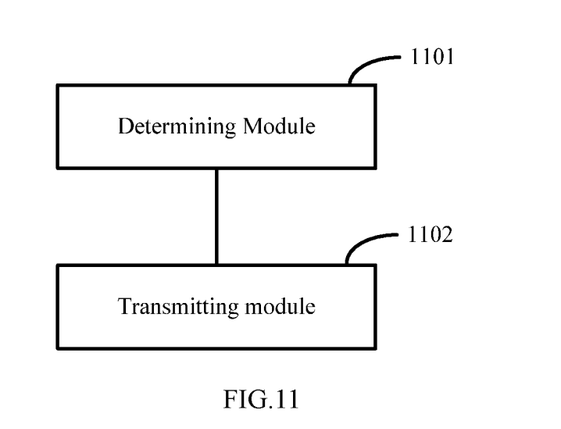
FIG. 11 is a configuration diagram showing a device for transmitting control information and data according to an exemplary embodiment.

FIG. 11 is a block diagram showing a device for transmitting control information and data according to an exemplary embodiment. The device may be achieved as part of or the entire of an electronic device by software, hardware or a combination thereof. Referring to FIG. 11, the device for transmitting control information and data includes a determining module 1101 and a transmitting module 1102.

The determining module 1101 is configured to determine a time-frequency resource corresponding to control information and user data to be sent.

The transmitting module 1102 is configured to transmit the control information and the user data on the time-frequency resource.

In response to that a first time-frequency resource corresponding to the control information and a second time-frequency resource corresponding to the user data belong to the same time unit, a part of the second time-frequency resource occupies starting time-domain symbols of the time unit; and/or In response to that the first time-frequency resource corresponding to the control information and the second time-frequency resource corresponding to the user data belong to different time units, the first time-frequency resource occupies at least a half of the time-domain symbols of a first time unit.

In an embodiment, the number of the starting time-domain symbols is determined according to the frequency band and the subcarrier spacing used for transmitting the control information and user data.

In an embodiment, in response to that the first time-frequency resource corresponding to the control information and the second time-frequency resource corresponding to the user data belong to the same time unit, transmission power of part of the user data prior to the control information and that of part of user data next to the control information are the same.

In an embodiment, the control information and/or the user data includes a demodulation reference signal.

In an embodiment, in response to that the first time-frequency resource corresponding to the control information and the second time-frequency resource corresponding to the user data belong to the same time unit, the first time-frequency resource and the second time-frequency resource belong to a first resource pool;

In response to that the first time-frequency resource corresponding to the control information and the second time-frequency resource corresponding to the user data belong to different time units, the first time-frequency resource and the second time-frequency resource belong to a second resource pool, where the first resource pool and the second resource pool misalign in the time-frequency resource.

As for the device provided in the foregoing embodiment, the specific manner in which each module performs the operation has been described in detail in the method embodiment, and detailed description will not be given here.

Figure 12:
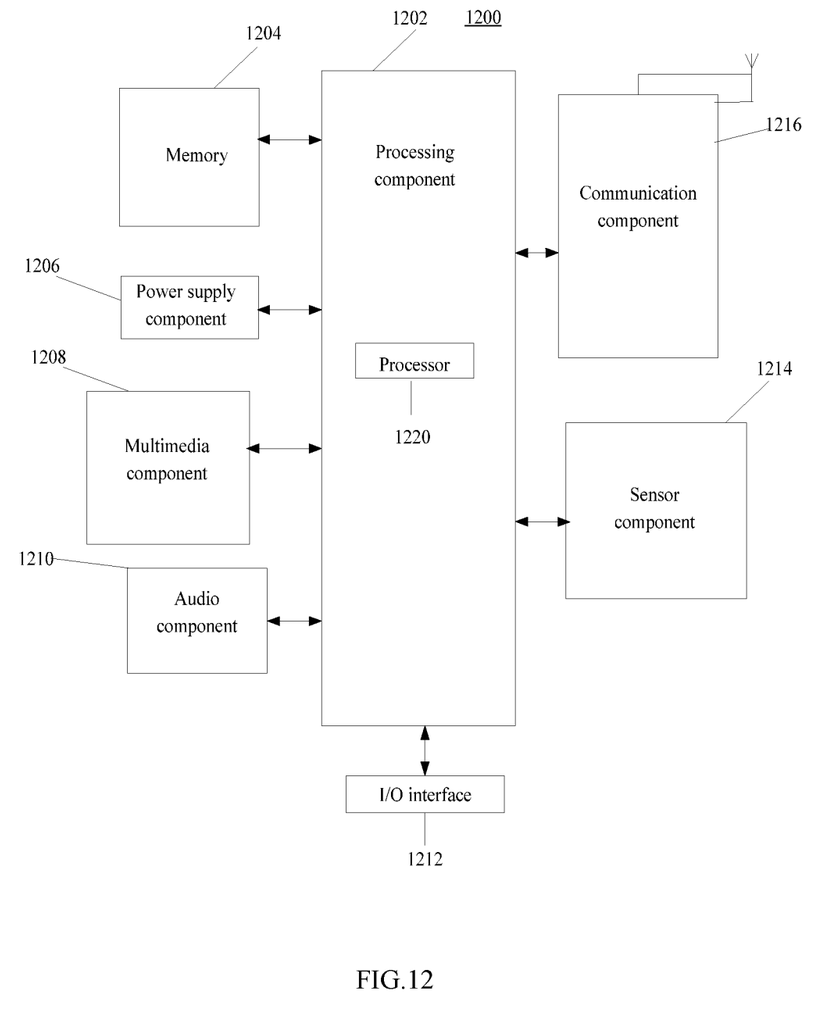
FIG. 12 is a block diagram showing a device suitable for transmitting control information and data according to an exemplary embodiment.

FIG. 12 is a block diagram showing a device for transmitting control information and data according to an exemplary embodiment. For example, the device 1200 may be a mobile phone, a computer, a digital broadcasting terminal, a messaging device, a game console, a tablet device, a medical device, a fitness device, a personal digital assistant, etc.

The device 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

Generally, the processing component 1202 is configured to control the overall operations of the device 1200, such as operations associated with displaying, telephone calls, data communications, camera operations, and recording operations. The processing component 1202 may include one or more processors 1220 to execute instructions to complete all or part of the steps in the foregoing method. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various data to support operations of the device 1200. Examples of the data include instructions of any application or method that can be run on the device 1200, contact data, phonebook data, messages, pictures and videos and the like. The memory 1204 can be implemented by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 1206 is configured to supply power to various components of the device 1200. The power supply component 1206 may include a power management system, one or more power supplies, and other components associated with generating, managing, and distributing power for the device 1200.

The multimedia component 1208 includes a screen that provides an output interface between the device 1200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 1208 includes a front camera and/or a rear camera. When the device 1200 is in an operation mode, such as a shooting mode or a video mode, the front camera and/or the rear camera can receive external multimedia data. Each front camera and rear camera can be a fixed optical lens system or have focal length and optical zoom capabilities.

The audio component 1210 is configured to output and/or input audio signals. For example, the audio component 1210 includes a microphone (MIC), and when the device 1200 is in an operation mode, such as a call mode, a recording mode, and a voice recognition mode, the microphone is configured to receive external audio signals. The received audio signal may be further stored in the memory 1204 or transmitted via the communication component 1216. In some embodiments, the audio component 1210 further includes a speaker for outputting audio signals.

The I/O interface 1212 provides an interface between the processing component 1202 and a peripheral interface module. The peripheral interface module may be a keyboard, a click wheel, a button, and the like. The button includes but not limits to a home button, a volume button, a start button and a lock button.

The sensor component 1214 includes one or more sensors for providing the device 1200 with state evaluation in various aspects. For example, the sensor component 1214 can detect the on/off state of the device 1200 and the relative positioning of the components, for example, the component is the display and the keypad of the device 1200. The sensor component 1214 can also detect the position change of the device 1200 or a component of the device 1200; detect whether the user contacts the device 1200; detect the orientation or acceleration/deceleration of the device 1200, and the temperature change of the device 1200. The sensor component 1214 may include a proximity sensor configured to detect the presence of nearby objects when there is no physical contact. The sensor component 1214 may also include a light sensor used for imaging application, such as a complementary metal oxide semiconductor (CMOS) or a charge coupled device (CCD) image sensor. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and other devices. The device 1200 can access a wireless network based on a communication standard, such as WiFi, 2G, or 3G, or a combination thereof. In an exemplary embodiment, the communication component 1216 receives a broadcast signal or broadcast related information from an external broadcast management system via a broadcast channel. In an exemplary embodiment, the communication component 1216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1200 may be implemented by one or more application specific integrated circuits (ASIC), digital signal processors (DSP), digital signal processing devices (DSPD), programmable logic devices (PLD), field programmable gate array (FPGA), a controller, a microcontroller, a microprocessor, or other electronic components, to execute the foregoing method.

In an exemplary embodiment, there is further provided a non-transitory computer-readable storage medium including instructions, such as a memory 1204 including instructions, which may be executed by the processor 1220 of the device 1200 to complete the foregoing method. For example, the non-transitory computer-readable storage medium may be a ROM, a random access memory (RAM), a CD-ROM, a magnetic tape, a floppy disk, an optical data storage device, etc.

An exemplary embodiment provides a device for transmitting control information and data, including:
a processor;
a memory for storing instructions executable by the processor;
where the processor is configured to: determine a time-frequency resource corresponding to control information and user data to be sent; and transmit the control information and the user data on the time-frequency resource.

In response to that a first time-frequency resource corresponding to the control information and a second time-frequency resource corresponding to the user data belong to the same time unit, a part of the second time-frequency resource occupies starting time-domain symbols of the time unit; and/or in response to that the first time-frequency resource corresponding to the control information and the second time-frequency resource corresponding to the user data belong to different time units, the first time-frequency resource occupies at least a half of time-domain symbols of a first time unit.

The processor is further configured to: determine the number of the starting time-domain symbols according to a frequency band and a subcarrier spacing configured to transmit the control information and the user data.

The processor is further configured to:
in response to that the first time-frequency resource corresponding to the control information and the second time-frequency resource corresponding to the user data belong to the same time unit, transmission power of part of the user data prior to the control information and that of part of user data next to the control information are the same.

The processor is further configured to:
the control information and/or the user data includes a demodulation reference signal.

The processor is further configured to:
in response to that the first time-frequency resource corresponding to the control information and the second time-frequency resource corresponding to the user data belong to the same time unit, the first time-frequency resource and the second time-frequency resource belong to a first resource pool;
in response to that the first time-frequency resource corresponding to the control information and the second time-frequency resource corresponding to the user data belong to different time units, the first time-frequency resource and the second time-frequency resource belong to a second resource pool, where the first resource pool and the second resource pool misalign in the time-frequency resource.

A computer-readable storage medium including instructions, that in response to that executed by the processor of the device, cause the device to execute the above-mentioned method of transmitting control information and data, including:
determine a time-frequency resource corresponding to the control information and the user data to be sent;
transmitting the control information and the user data on the time-frequency resource; and
in response to that a first time-frequency resource corresponding to the control information and a second time-frequency resource corresponding to the user data belong to the same time unit, a part of the second time-frequency resource occupies starting time-domain symbols of the time unit; and/or in response to that the first time-frequency resource corresponding to the control information and the second time-frequency resource corresponding to the user data belong to different time units, the first time-frequency resource occupies at least a half of time-domain symbols of a first time unit.

The instructions in the storage medium may also include:
determining the number of the starting time-domain symbols according to a frequency band and a subcarrier spacing configured to transmit the control information and the user data.

The instructions in the storage medium may also include:
in response to that the first time-frequency resource corresponding to the control information and the second time-frequency resource corresponding to the user data belong to the same time unit, transmission power of part of the user data prior to the control information and that of part of user data next to the control information are the same.

The instructions in the storage medium may also include:
the control information and/or the user data includes a demodulation reference signal.

The instructions in the storage medium may also include:
in response to that the first time-frequency resource corresponding to the control information and the second time-frequency resource corresponding to the user data belong to the same time unit, the first time-frequency resource and the second time-frequency resource belong to a first resource pool;
in response to that the first time-frequency resource corresponding to the control information and the second time-frequency resource corresponding to the user data belong to different time units, the first time-frequency resource and the second time-frequency resource belong to a second resource pool, where the first resource pool and the second resource pool misalign in the time-frequency resource.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is merely defined by the appended claims.

What is claimed is:

1. A method for transmitting control information and data, comprising:
    determining, by a user equipment (UE) in Internet of Vehicles performing a sidelink transmission, a first time-frequency resource corresponding to control information to be sent and a second time-frequency resource corresponding to user data to be sent;
    transmitting, by the UE, the control information and the user data on the first time-frequency resource and the second time-frequency resource, respectively; and
    wherein in case that the first time-frequency resource corresponding to the control information and the second time-frequency resource corresponding to the user data belong to a same slot, a part of the second time-frequency resource is set to occupy a starting time-domain symbol of the slot by the UE;
    wherein a number of the starting time-domain symbol is determined according to a frequency band and a sub-carrier spacing configured to transmit the control information and the user data; and
    in case that the first time-frequency resource and the second time-frequency resource belong to the same slot, transmission power of part of the user data prior to the control information is set to be identical to transmission power of part of user data next to the control information.

2. The method according to claim 1, wherein the control information comprises a demodulation reference signal.

3. The method according to claim 1, wherein in case that the first time-frequency resource corresponding to the control information and the second time-frequency resource corresponding to the user data belong to the same slot, the first time-frequency resource and the second time-frequency resource belong to a first resource pool.

4. The method according to claim 1, wherein in case that the first time-frequency resource and the second time-frequency resource belong to the same slot, the control information and the user data occupy the same frequency domain start position and bandwidth.

5. The method according to claim 1, wherein in case that the first time-frequency resource and the second time-frequency resource belong to the same slot, the control information and the user data occupy different frequency domain start positions and bandwidths.

6. The method according to claim 1, wherein in case that the first time-frequency resource and the second time-frequency resource belong to the same slot, the part of the user data prior to the control information and the part of the user data next to the control information occupy the same frequency domain starting position and bandwidth.

7. The method according to claim 1, wherein in case that the first time-frequency resource and the second time-frequency resource belong to the same slot, the part of the user data prior to the control information and the part of the user data next to the control information occupy different frequency domain starting positions and bandwidths.

8. A device for transmitting control information and data, comprising:
    a processor; and
    a memory for storing instructions executable by the processor;
    wherein the processor is configured to:
    determine a first time-frequency resource corresponding to control information to be sent and a second time-frequency resource corresponding to user data to be sent; transmit the control information and the user data on the first time-frequency resource and the second time-frequency resource, respectively; and
    wherein in case that the first time-frequency resource corresponding to the control information and the second time-frequency resource corresponding to the user data belong to a same slot, a part of the second time-frequency resource is set to occupy a starting time-domain symbol of the slot;
    wherein a number of the starting time-domain symbol is determined according to a frequency band and a sub-carrier spacing configured to transmit the control information and the user data; and
    in case that the first time-frequency resource and the second time-frequency resource belong to the same slot, transmission power of part of the user data prior to the control information is set to be identical to transmission power of part of user data next to the control information.

9. The device according to claim 8, wherein the control information comprises a demodulation reference signal.

10. The device according to claim 8, wherein in case that the first time-frequency resource corresponding to the control information and the second time-frequency resource corresponding to the user data belong to the same slot, the first time-frequency resource and the second time-frequency resource belong to a first resource pool.

* * * * *